Patented May 21, 1935

2,002,176

UNITED STATES PATENT OFFICE 2,002,176

GYPSUM PLASTER AND METHOD OF MANUFACTURING SAME

Joseph G. Gustafson, Midland, Calif., assignor to United States Gypsum Company, Chicago, Ill., a corporation of Illinois No Drawing. Application February 3, 1934, Serial No. 709,594

3 Claims. (Cl. 106—34)

This invention relates to gypsum plasters and their method of manufacture.

In manufacturing gypsum plaster from certain deposits of gypsum, the resulting calcined gypsum has a low consistency which gives it a low coverage when used as a wall plaster, and also gives it short working qualities.

An object of this invention therefore is to provide a gypsum plaster and its method of manufacture in which the consistency of the resulting calcined gypsum is materially increased by the addition of paraffin at the time of calcination; also to improve gypsum plasters and their method of manufacture in other respects hereinafter specified and claimed.

Ground gypsum is usually calcined to form a plaster by heating up in kettles with mechanical agitation, which serves to drive off about three-fourths of the water of crystallization contained in the gypsum and produce a calcined gypsum. This calcined gypsum is commonly used as wall plaster by mixing it with water to form a mortar, the calcined gypsum or plaster of Paris again combining with some of the water to again form gypsum.

I have discovered that by adding comminuted paraffin at the time of calcination to the kettle of boiling gypsum, the paraffin evenly distributes throughout the mass of gypsum and the resulting plaster of Paris plaster has an unusually high consistency and superior qualities which makes it suitable for use as a wall plaster. I have found that the least amount of paraffin which noticeably enriches the calcined gypsum, is ⅛ pound of paraffin to a kettle containing thirteen tons of ground gypsum. This quantity may be increased considerably to as much as 25 pounds of paraffin to the kettle of gypsum, the use of ten pounds of paraffin to the kettle being desirable for good working properties in the resulting calcined gypsum. The range of variation permitted in the amount of additive paraffin will, therefore, be about 0.00048% to 0.096%.

The following table gives the consistency and other properties of the calcined gypsum without paraffin and with varying amounts of paraffin:

having a diameter of 3½" per 50 cc. of calcined gypsum.

I find it desirable to tube-mill the stucco after calcination as this serves also to increase the consistency of the product. I find that by use of the paraffin, more balls can be used in the tube mills than ordinarily carried, with the result that the walls are very hard and the plaster is satisfactory in every respect.

Several properties of the resulting calcined gypsum or stucco made with the use of paraffin are especially noticeable as follows:

1.—The paraffin whitens the stucco.
2.—The consistency of the stucco is materially increased.
3.—No bin calcination takes place in the hot pit after calcination in the kettle.
4.—The paraffin lubricates the individual particles of gypsum so that it is possible to use fuller kettles as the material is not dashed around as much by the kettle sweeps.
5.—There is a very distinct and noticeable betterment in working qualities, viz., more plastic, smoother working and richer in appearance.
6.—There is a very little drop in mortar consistency on storage of the calcined gypsum up to storage period of three months.
7.—The resulting calcined gypsum does not have a sharply defined pouring consistency.

I would state in conclusion that while the details specified represent a practical embodiment of my invention, I do not wish to limit myself precisely to these details, since manifestly, the same may be considerably varied, without departing from the spirit of the invention as defined in the appended claims.

Having thus described my invention, I claim as new and desire to secure by Letters Patent:—

1. The method of manufacturing calcined gypsum of high consistency, which comprises calcining a mass of ground raw gypsum mixed with 0.00048% to 0.096% of paraffin.

2. A high consistency calcined gypsum containing 0.00048% to 0.096% paraffin dispersed by calcination of the raw gypsum.

3. The method of manufacturing calcined gyp-

| No paraffin | 90 cc. cons. | 6.0% moist. | 34" set | 94% thru 100 |
| 10# paraffin | 98 cc. cons. | 5.8% moist. | 32" set | 92% thru 100 |
| 15# paraffin | 104 cc. cons. | 6.0% moist. | 44" set | 93% thru 100 |

By consistency is meant the amount of water in cc., which is added to 100 grams of the calcined gypsum to produce a mortar which will pour from a cup onto a glass plate and produce a patty sum plaster of high consistency, which comprises calcining ground gypsum in the presence of paraffin, and tube milling the resulting product.

JOSEPH G. GUSTAFSON.